United States Patent [19]

Stark

[11] Patent Number: 5,741,835

[45] Date of Patent: Apr. 21, 1998

[54] AQUEOUS DISPERSIONS OF EPOXY RESINS

[75] Inventor: Charles John Stark, Houston, Tex.

[73] Assignee: Shell Oil Company, Houston, Tex.

[21] Appl. No.: 896,118

[22] Filed: Jul. 17, 1997

Related U.S. Application Data

[63] Continuation of Ser. No. 551,205, Oct. 31, 1995, abandoned.

[51] Int. Cl.$^6$ .............................. C08K 3/20; C08L 63/00
[52] U.S. Cl. ..................... 523/403; 523/427; 525/438; 525/524; 525/531; 525/533; 528/103; 528/103.5
[58] Field of Search ........................ 523/403, 427; 525/438, 524, 531, 533; 528/103, 103.5

[56] References Cited

U.S. PATENT DOCUMENTS

| | | | |
|---|---|---|---|
| 3,404,018 | 10/1968 | Hicks | 106/252 |
| 3,816,365 | 6/1974 | Schmid et al. | 260/22 |
| 4,092,295 | 5/1978 | Takamori et al. | 260/47 |
| 4,256,916 | 3/1981 | Morris et al. | 562/537 |
| 4,315,044 | 2/1982 | Elmore et al. | 427/386 |
| 4,415,682 | 11/1983 | Becker | 523/403 |
| 4,479,881 | 10/1984 | Tai | 252/8.8 |
| 4,479,887 | 10/1984 | Seibert | 252/309 |
| 4,608,406 | 8/1986 | Williams, Jr., et al. | 523/424 |
| 4,797,464 | 1/1989 | Nodelman | 528/110 |
| 4,987,163 | 1/1991 | Becker et al. | 523/414 |
| 5,118,729 | 6/1992 | Piechocki | 523/404 |
| 5,140,069 | 8/1992 | Mülhaupt et al. | 525/109 |
| 5,250,727 | 10/1993 | Fried | 562/540 |

FOREIGN PATENT DOCUMENTS

| | | |
|---|---|---|
| 356775 | 5/1980 | Austria . |
| 0347793 | 12/1989 | European Pat. Off. . |
| 0497404 A1 | 5/1992 | European Pat. Off. . |
| 1329190 | 9/1973 | United Kingdom . |
| 2055844 | 3/1981 | United Kingdom . |

OTHER PUBLICATIONS

"Structure Modification Study of Epoxy Resins in Heat–Cured Lacquers," *Chemical Abstracts*, vol. 109, No. 18, 31 Oct. 1988, pp. 315–329, Apr. 1996.

"Epoxy Resin Derivatives for Stoving Systems," *Chemical Abstracts*, vol. 110, No. 18, 1 May 1989, pp. 6–9, Apr. 6, 1996.

International Search Report of Apr. 6, 1996.

*Primary Examiner*—Randy Gulakowski

[57] ABSTRACT

A stable aqueous emulsions of epoxy resins are provided using an epoxy-functional polyether having the formula:

$$\text{(I)} \quad \overset{O}{\underset{}{\triangle}}\!\!\!-\!O\!-\!R^2\!-\!O\!-\!\underset{O}{\overset{OH}{\text{C}}}\!-\!\left(\!O\!-\!\underset{Y}{\overset{X}{\text{C}}}\!\right)_{\!m}\!\!\left(\!O\!\right)_{\!n}\!\!OR^1;$$

$$\text{(II)} \quad (R^3)_3\!\!-\!\!\underset{(R^4)_s}{\overset{}{\bigcirc}}\!\!-\!O\!-\!\underset{O}{\overset{OH}{\text{C}}}\!-\!\left(\!O\!-\!\underset{Y}{\overset{X}{\text{C}}}\!\right)_{\!m}\!\!\left(\!O\!\right)_{\!n}\!\!OR^1$$

$$s = 1,2$$

$$R^4 = \left(\!\!\underset{(R^3)_3}{\overset{}{\bigcirc}}\!\!-\!CH_2\!-\!\underset{(R^3)_3}{\overset{}{\bigcirc}}\!\!-\!CH_2\!\right)_{\!r};$$

$$\text{(III)} \quad \overset{O}{\underset{}{\triangle}}\!-\!\!\underset{OH}{\overset{A}{\bigcirc}}$$

$$A = \overset{O}{\underset{O}{\text{C}}}\!-\!\left(\!O\!-\!\underset{Y}{\overset{X}{\text{C}}}\!\right)_{\!m}\!\!\left(\!O\!\right)_{\!n}\!\!OR^1;$$

$$\text{(IV)} \quad \overset{OH}{\underset{O}{\bigcirc}}\!\!-\!A;$$

$$\text{(V)} \quad \overset{R^{10}}{\underset{O}{\bigcirc}}\!-\!R^8\!-\!\!\underset{OH}{\overset{A}{\bigcirc}}$$

wherein $R^1$ is a $C_1$–$C_{15}$ alkyl, aryl or alkylaryl group, $R^2$ is a divalent aliphatic group, a divalent cycloaliphatic group, a divalent aryl group, or a divalent arylaliphatic group, $R^3$ is independently a hydrogen or a $C_1$–$C_{10}$ alkyl group, $R^8$ is a divalent aliphatic group optionally containing ether or ester group(s) or together with $R^9$ or $R^{10}$ form a spiro ring optionally containing heteroatoms, and $R^9$ and $R^{10}$ are independently hydrogen or $R^9$ or $R^{10}$ together with $R^8$ form a spiro ring optionally containing heteroatoms such as oxygen, r is a real number from about 0 to about 6, X and Y are independently a hydrogen, methyl or ethyl group with the provision that if X is methyl or ethyl, Y is hydrogen or if Y is methyl or ethyl, X is hydrogen and n+m is a real number from about 15 to about 450 and n is a real number in an amount effective to provide emulsifying property.

12 Claims, No Drawings

AQUEOUS DISPERSIONS OF EPOXY RESINS

This is a continuation of application Ser. No. 08/551,205, filed Oct. 31, 1995 now abandoned.

FIELD OF THE INVENTION

This invention relates to aqueous dispersions of epoxy resins. In one aspect, the invention relates to improved aqueous dispersions of epoxy resins which provide improved coating properties.

BACKGROUND OF THE INVENTION

Aqueous dispersions of epoxy resins have been known for many years. However, the performance of these dispersions as elements of coatings has been viewed as inferior to their solvent borne counterparts. It is known that the surfactants employed to render the epoxy component emulsifiable such as nonylphenol ethoxylates, alkylphenol initiated poly (oxyethylene) ethanols, alkylphenol initiated poly (oxypropylene) poly(oxyethylene) ethanols, and block copolymers containing an internal poly(oxypropylene) block and two external poly(oxyethylene) ethanol blocks readily migrate to surface interfaces where, it is speculated, they deleteriously affect film performance. Therefore, there is a continuous need for improved aqueous dispersions of epoxy resins which provide good coating properties.

SUMMARY OF THE INVENTION

According to the invention, an aqueous dispersion of an epoxy resin is provided comprising:
a) water;
b) at least one epoxy resin having a functionality of greater than about 1.0 epoxide group per molecule;
c) from about 1 to about 20 weight percent, based on the epoxy resin of at least one epoxy-functional polyether as having the formula:

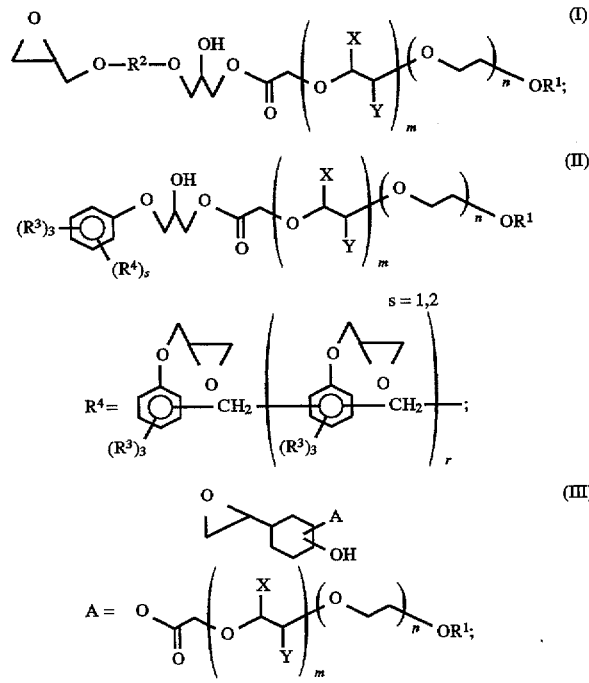

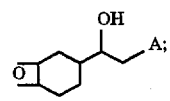

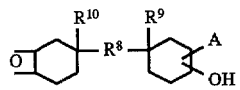

wherein $R^1$ is a $C_1$–$C_{15}$ alkyl, aryl or alkylaryl group, $R^2$ is a divalent aliphatic group, a divalent cycloaliphatic group, a divalent aryl group, or a divalent arylaliphatic group, $R^3$ is independently a hydrogen or a $C_1$–$C_{10}$ alkyl group, $R^8$ is a divalent aliphatic group optionally containing ether or ester group(s) or together with $R^9$ or $R^{10}$ form a spiro ring optionally containing heteroatoms, and $R^9$ and $R^{10}$ are independently hydrogen or $R^9$ or $R^{10}$ together with $R^8$ form a spiro ring optionally containing heteroatoms such as oxygen, r is a real number from about 0 to about 6, X and Y are independently a hydrogen, methyl or ethyl group with the provision that if X is methyl or ethyl, Y is hydrogen or if Y is methyl or ethyl, X is hydrogen and n+m is a real number from about 15 to about 450 and n is a real number in an amount effective to provide emulsifying property.

Further, curable epoxy resin compositions comprising these epoxy resin dispersions and water-compatible curing agents are provided.

DETAILED DESCRIPTION OF THE INVENTION

It has been found that by using a certain epoxy-functional polyether surfactant an effective aqueous epoxy resin emulsion can be formed having an average particle size of generally less than about 1 μm.

Epoxy-Functional Polyether Component

The epoxy-functional polyether surfactant useful in the invention can be represented by the formula:

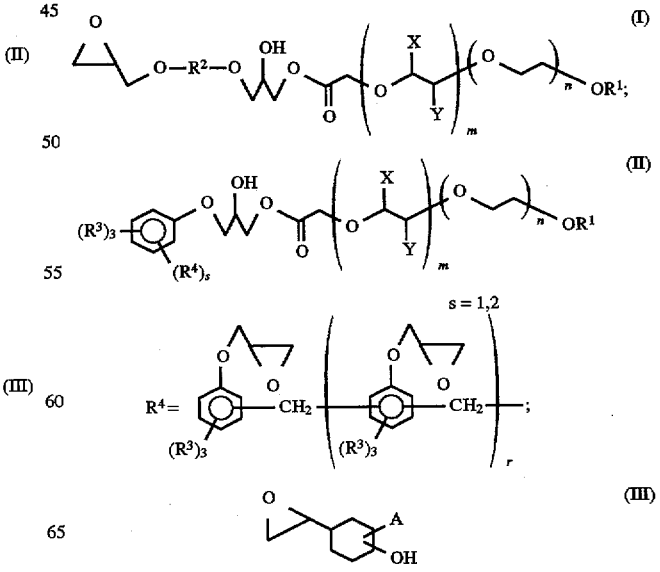

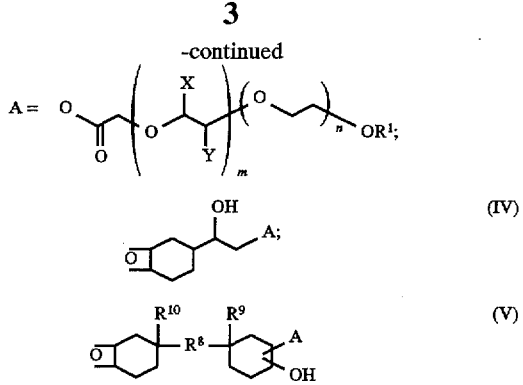

wherein $R^1$ is a $C_1$–$C_{15}$ alkyl, aryl or alkylaryl group, preferably $C_1$–$C_4$ alkyl or nonylphenyl, most preferably a methyl, $R^2$ is a divalent aliphatic group, a divalent cycloaliphatic group, a divalent aryl group, or a divalent arylaliphatic group, preferably having from 2 to 1000 carbon atoms, $R^3$ is independently a hydrogen or a $C_1$–$C_{10}$ alkyl group, $R^8$ is a divalent aliphatic group optionally containing ether or ester group(s) or together with $R^9$ or $R^{10}$ form a spiro ring optionally containing heteroatoms, and $R^9$ and $R^{10}$ are independently hydrogen or $R^9$ or $R^{10}$ together with $R^8$ form a spiro ring optionally containing heteroatoms such as oxygen, r is a real number from about 0 to about 6, X and Y are independently a hydrogen, methyl or ethyl group with the provision that if X is methyl or ethyl, Y is hydrogen or if Y is methyl or ethyl, X is hydrogen and n+m is a real number from about 15, more preferably from about 45, to about 450, preferably to about 400 and n is a real number in an effective amount to give emulsifying property, which is at least about 15. The different location of the "OH" and "A" bonding to the cycloaliphatic ring represents the different isomers formed by the cycloaliphatic oxirane ring opening reaction. It can be appreciated that the acid "A" moiety can be attached to either 3- or 4-position from $R^8$ in formula (V) or epoxy moiety in formula (III). The epoxy-functional polyether surfactant preferably has a molecular weight within the range of from about 1000, preferably from about 2000, to about 40,000, preferably to about 20,000. The residue of epoxy resin, such as the number of carbons in $R^2$, and the number of n are preferably balanced to obtain a surface active composition.

The epoxy-functional polyether component can be produced by reacting (a) a carboxylic acid having the formula:

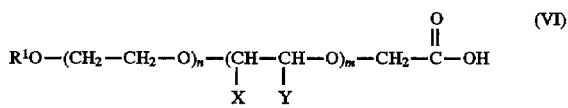

wherein $R^1$ is a $C_1$–$C_{15}$ alkyl, aryl or alkylaryl group and X and Y are independently hydrogen, methyl or ethyl groups with the provision that if X is methyl or ethyl, Y is hydrogen or if Y is methyl or ethyl, X is hydrogen and n and m are real numbers defined above, and (b) an epoxy resin having a functionality of at least about 1.5 epoxide group per molecule.

The carboxylic acid is contacted with the epoxy resin under conditions effective to react the acid group and the epoxide group. Typically, the mole ratio of the carboxylic acid to epoxy resin is within the range of about 1:1 to about 1:500. The reaction is typically carried out at a temperature from ambient temperature to an elevated temperature sufficient to react the acid group and the epoxide group preferably within the range of from about 90° C. to about 150° C. for a time effective to produce the reaction products. The progress of the reaction can be monitored and targeted to produce the desired product by measuring the acid equivalent weight and the epoxy equivalent weight of the reactant mixture. Generally, the reaction mixture is heated until an acid equivalent weight of the mixture indicates greater or equal than 99% of the original number of equivalents of acid is consumed, and at least an equivalent amount of epoxies is consumed which is generally one hour or greater. For cycloaliphatic epoxies, the monitoring of the course of reaction by following consumption of epoxy alone can be misleading, due to competing homopolymerization of this type of epoxy group. Preferably, this reaction is carried out in the presence of a catalyst.

The catalysts are bases or metal chelates such as, for example, ammonium compounds, phosphonium compounds, tertiary amines, and phosphines. Examples of more preferred catalysts include, for example, triphenylphosphonium acid acetate, ethyltriphenyl phosphonium iodide, benzyldimethylamine, triphenylphosphine, tributylamine, aluminum salicylates, tetramethylammonium hydroxide and the like. The amount of catalyst present is preferably from about 0.05 to about 2.0 weight percent based on the total weight of the epoxy resin and the carboxylic acid.

If desired the surfactant can be recovered from the reaction mixture or made "in-situ." To provide the surfactant in-situ in the desired epoxy resin component, the carboxylic acid can be reacted into the desired epoxy resin component. For the in-situ method, the epoxy resin should be present in an amount sufficient to provide unreacted epoxy resin component and the surfactant adduct. Further, to provide the surfactant in-situ in an advanced epoxy resin, the carboxylic acid can be reacted into the mixtures of diglycidyl ethers of dihydric phenols and phenolic compounds during advancement reaction or can be reacted into after the advancement reaction. Typically, about 3 to about 12 weight percent of carboxylic acid, based on epoxy resin or epoxy resin and phenolic compound, is used.

The preferred hydrophilic carboxylic acid can be produced by oxidation of a polyethylene glycol monoalkylether or a monoalkylether of a block copolymer of ethylene oxide and propylene oxide or butylene oxide ("polyalkylene glycol"). Preferably the polyalkylene glycol has a formula:

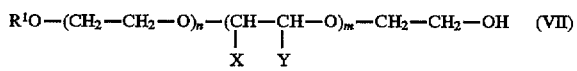

wherein $R^1$ is a $C_1$–$C_{15}$ alkyl, aryl or alkylaryl group, preferably $C_1$–$C_4$ alkyl or nonylphenyl, most preferably a methyl and n is a positive real number from defined above. Polyalkylene glycols generally contain a distribution of compounds with a varying number of oxyethylene units, n and oxypropylene or oxybutylene units, m. To obtain a good emulsion, the number of oxyethylene units, n, is preferably at least 1:5. Generally, the quoted number of units is the whole number closest to the statistical average, and the peak of the distribution.

The carboxylic acid can be produced by oxidation of a corresponding polyethylene glycol monoether including, but not limited to, the processes described in U.S. Pat. No. 5,250,727.

The hydrophobic epoxy resins can be any reactive epoxy resin having a 1,2-epoxy equivalency (functionality) preferably, on the average, greater than about 1.5 epoxide groups per molecule. The epoxy resin can be saturated or unsaturated, linear or branched, aliphatic, cycloaliphatic, aromatic or heterocyclic, and may bear substituents which do not materially interfere with the reaction with the carboxylic acid. Such substituents can include bromine or fluorine. They may be monomeric or polymeric, liquid or solid, but are preferably liquid or a low melting solid at room temperature. Suitable epoxy resins include glycidyl ethers prepared by reacting epichlorohydrin with a compound containing at least 1.5 aromatic hydroxyl groups carried out under alkaline reaction conditions. Examples of other epoxy resins suitable for use in the invention include diglycidyl ethers of dihydric compounds, epoxy novolacs and cycloaliphatic epoxies. Generally epoxy resins contain a distribution of compounds with a varying number of repeat units.

Preferred epoxy resins include, but are not limited to, those represented by the formula:

Preferably the epoxy resin is a diglycidyl ether of a dihydric phenol, diglycidyl ether of a hydrogenated dihydric phenol, an aliphatic glycidyl ether, epoxy novolac or a cycloaliphatic epoxy.

Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl)propane (bisphenol-A); 2,2-bis(4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with

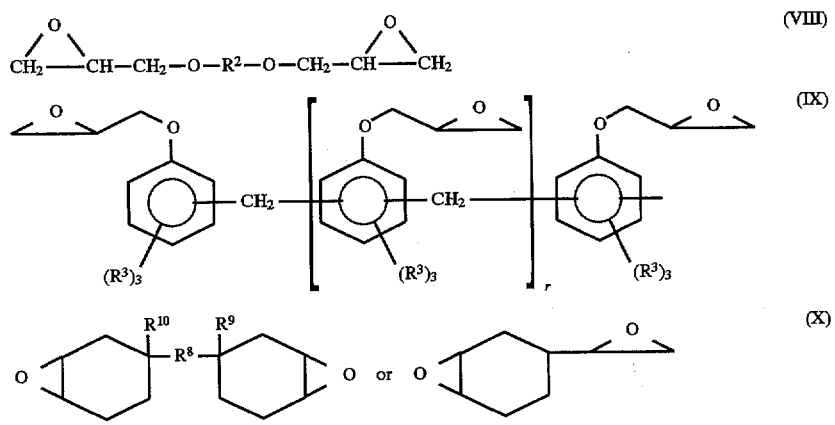

wherein r is a real number from about 0 to about 6, $R^2$ is divalent aliphatic, divalent cycloaliphatic, divalent aryl, or divalent arylaliphatic group, preferably $R^2$ contains about 8 to 120 carbon atoms, $R^3$ is independently a hydrogen or a $C_1$-$C_{10}$ alkyl group, $R^8$ is a divalent aliphatic group optionally containing ether or ester group(s) or together with $R^9$ or $R^{10}$ form a spiro ring optionally containing heteroatoms, and $R^9$ and $R^{10}$ are independently hydrogen or $R^9$ or $R^{10}$ together with $R^8$ form a spiro ring optionally containing heteroatoms such as oxygen, preferably $R^8$ contains about 1 to 20 carbon atoms. The term aliphatic or cycloaliphatic includes compounds having oxygen and/or sulfur atoms on the backbone. For example, $R^2$ can be a divalent cycloaliphatic group having the formula

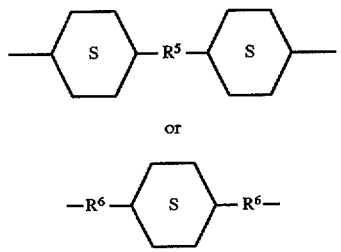

or

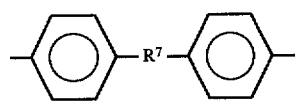

wherein $R^5$ and $R^6$ are each independently an alkylene group, or a divalent arylaliphatic group having the formula

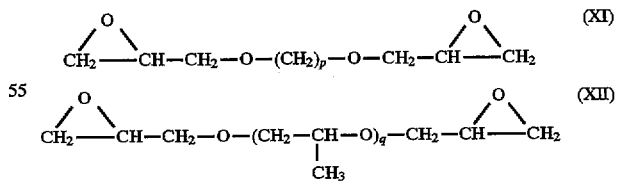

wherein $R^7$ is an alkylene group.

aldehydes such as formaldehyde (bisphenol-F). Diglycidyl ethers of dihydric phenols includes advancement products of the above diglycidyl ethers of dihydric phenols with phenolic compounds such as bisphenol-A, such as those described in U.S. Pat. Nos. 3,477,990 and 4,734,468.

Diglycidyl ethers of hydrogenated dihydric phenols can be produced, for example, by hydrogenation of dihydric phenols followed by glycidation reaction with an epihalohydrin in the presence of a Lewis acid catalyst and subsequent formation of the glycidyl ether by reaction with sodium hydroxide. Examples of suitable dihydric phenols are listed above.

Aliphatic glycidyl ethers can be produced, for example, by reacting an epihalohydrin with an aliphatic diol in the presence of a lewis acid catalyst followed by conversion of the halohydrin intermediate to the glycidyl ether by reaction with sodium hydroxide. Examples of preferred aliphatic glycidyl ethers include those corresponding to the formulas:

$$CH_2\overset{O}{-}CH-CH_2-O-(CH_2)_p-O-CH_2-CH\overset{O}{-}CH_2 \quad (XI)$$

$$CH_2\overset{O}{-}CH-CH_2-O-(CH_2-\underset{CH_3}{CH}-O)_q-CH_2-CH\overset{O}{-}CH_2 \quad (XII)$$

wherein:
p is an integer from 2 to 12, preferably from 2 to 6; and
q is an integer from 4 to 24, preferably from 4 to 12.

Examples of suitable aliphatic glycidyl ethers include for example, diglycidyl ethers of 1,4 butanediol, neopentyl glycol, cyclohexane dimethanol, hexanediol, polypropylene glycol, and like diols and glycols; and triglycidyl ethers of trimethylol ethane and trimethylol propane.

Epoxy novolacs can be produced by condensation of formaldehyde and a phenol followed by glycidation by reaction of an epihalohydrin in the presence of an alkali. The phenol can be for example, phenol, cresol, nonylphenol and t-butylphenol. Examples of the preferred epoxy novolacs include those corresponding to the formula:

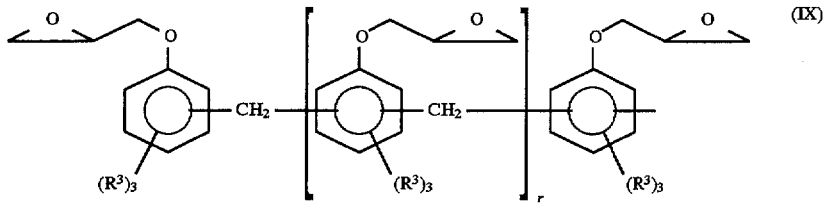

wherein $R^3$ is independently a hydrogen or a $C_1$–$C_{10}$ alkyl group and r is a real number from about 0 to about 6. Epoxy novolacs generally contain a distribution of compounds with a varying number of glycidated phenoxymethylene units, r. Generally, the quoted number of units is the number closest to the statistical average, and the peak of the distribution.

Cycloaliphatic epoxies can be produced by epoxidizing a cycloalkene-containing compound with greater then one olefinic bond with peracetic acid. Examples of the preferred cycloaliphatic epoxies include those corresponding to the formula:

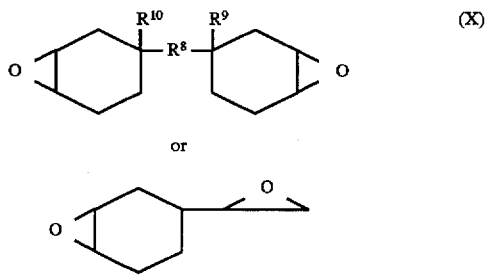

wherein $R^8$ is a divalent aliphatic group optionally containing ether or ester group(s) or together with $R^9$ or $R^{10}$ form a spiro ring optionally containing heteroatoms, and $R^9$ and $R^{10}$ are independently hydrogen or $R^9$ or $R^{10}$ together with $R^8$ form a spiro ring optionally containing heteroatoms such as oxygen, preferably $R^8$ contains from about 1 to about 20 carbon atoms. Examples of cycloaliphatic epoxies include, for example, 3,4-epoxycyclohexylmethyl-(3,4-epoxy) cyclohexane carboxylate, dicycloaliphatic diether diepoxy [2-(3,4-epoxy)cyclohexyl-5,5-spiro(3,4-epoxy)-cyclohexane-m-dioxane], bis(3,4-epoxycyclohexylmethyl) adipate, bis(3,4-epoxycyclohexyl)adipate and vinylcyclohexene dioxide [4-(1,2-epoxyethyl)-1,2-epoxycyclohexane]. Cycloaliphatic epoxies include compounds of the formulas:

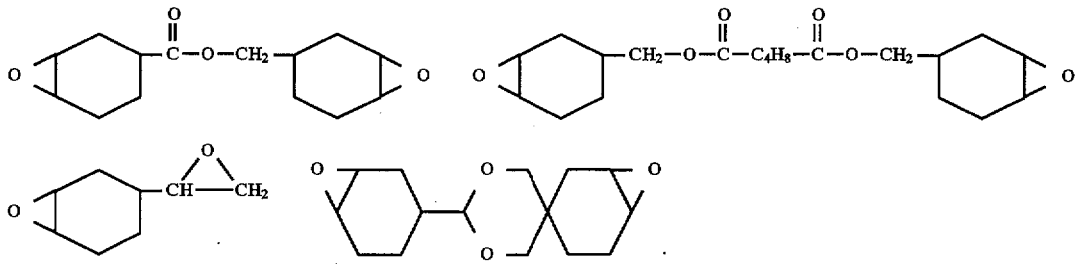

Commercial examples of preferred epoxy resins include, for example, EPON® Resins DPL-862, 828, 826, 825, 1001, EPONEX® Resin 1510, HELOXY® Modifiers 107, 67, 68, and 32 all available from Shell Chemical Company and Union Carbide Epoxy Resins ERL-4221, -4289, -4299, -4234 and -4206.

The hydrophilic carboxylic acid is contacted with the hydrophobic epoxy resin under conditions effective to react the acid group and the epoxide group and to produce the epoxy-functional polyethers.

Epoxy Resin Component

The epoxy resin component can be any epoxy resin having a functionality of greater than about 1.0 epoxide group per molecule, preferably at least about 1.2 epoxide group per molecule. These epoxy resins include those mentioned above for use in preparing the surfactant. Suitable epoxy resins include glycidyl ethers prepared by reacting epichlorohydrin with a compound containing, on the average, greater than one hydroxyl group carried out under alkaline reaction conditions. Examples of epoxy resins suitable for use in the invention include in addition to the epoxy resins mentioned above, polyglycidyl esters of polycarboxylic acids, and glycidylmethacrylate-containing acrylic resin. Polyglycidyl esters of polycarboxylic acids are mentioned below.

Aqueous Epoxy Resin Dispersions

In a typical aqueous dispersion of the invention useful for coating applications, the amount of the epoxy resin component (b) is from about 30 to about 70 percent by weight, preferably from about 55 to about 65 percent by weight, based on the total dispersion. Generally, a) water and b) an epoxy resin having a functionality of greater than about 1.0 epoxide group per molecule are mixed under conditions effective to provide an oil-in-water emulsion in the presence of c) from about 3, preferably from about 4, more preferably from about 6, to about 20, most preferably to about 10 weight percent, based on the epoxy resin of at least one epoxy-functional polyether surfactant mentioned above. One or more epoxy-functional polyether surfactant can be used. It has been found that the invention provides a stable good aqueous dispersion having an average particle size of preferably less than about 2 μm, more preferably less than about 1 μm.

The epoxy resin coating composition of the invention may include other additives, such as elastomers, stabilizers, extenders, plasticizers, pigments, pigment pastes, antioxidants, leveling or thickening agents, defoaming agents and/or wetting agents, reactive diluents, fillers, catalysts, and the like. The aqueous dispersion can contain an monoepoxide diluent as an reactive diluent.

Preferable reactive diluents are those which contain a water-immiscible $C_{8-20}$ aliphatic monoepoxide. The monoepoxide component can contain alicyclic and aromatic structures, as well as halogen, sulfur, phosphorus, and other such heteroatoms. Reactive diluents can be, for example, epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is glycidyl ether of monohydric $C_{8-14}$ aliphatic alcohols.

Useful coating compositions can be obtained by mixing an epoxy resin curing agent with the aqueous epoxy resin dispersion mentioned above.

Curing Agent

The epoxy resin curing agent can be any curing agent effective to cure (or crosslink) the epoxy resin dispersed in the aqueous solution. These curing agents are generally water compatible (i.e., dilutable and/or dispersable). Suitable curing agents for use with the dispersions include those typically employed with epoxy resins, such as aliphatic, araliphatic and aromatic amines, polyamides, amidoamines and epoxy-amine adducts. They exhibit varying levels of compatibility with water, depending upon the nature of the starting materials employed for their preparation. In many cases, partial ionization with acetic acid, propionic acid and the like is required to effect or improve water compatibility or emulsifiability.

Preferably for curing at room temperature or lower temperatures an epoxide equivalent to amine hydrogen equivalent ratio of from about 1:0.75 to about 1:1.5 are generally employed. Suitable polyalkylene amines curing agents are those which are soluble or dispersible in water and which contain more than 2 active hydrogen atoms per molecule such as diethyleneamine, triethylenetetramine, tetraethylenepentamine, etc. Other suitable curing agents include, for example, 2,2,4-and/or2,4,4-trimethylhexamethylenediamine, 1,6-hexanediamine, 1-ethyl-1,3-propanediamine, 2,2(4) ,4-trimethyl-1,6-hexanediamine, bis(3-aminopropyl)piperazine, N-aminoethylpiperazine, N,N-bis(3-aminopropyl) ethylenediamine, 2,4(6)-toluenediamine and also cycloaliphatic amines such as 1,2-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophoronediamine, norboranediamine, 4,4'-diaminodicyclohexylmethane, 4,4'-diaminodicyclohexylmethane, 4,4'-diaminodicyclohexylpropane, 2,2-bis(4-aminocyclohexyl) propane, 3,3'-dimethyl-4,4'-diaminodicyclohexylmethane, 3-amino-1-cyclohexaneaminopropane, 1,3- and 1,4-bis (aminomethyl)cyclohexane. As araliphatic amines, in particular those amines are employed in which the amino groups are present on the aliphatic radical for example m- and p-xylylenediamine or their hydrogenation products. The amines may be used alone or as mixtures.

Suitable amine-epoxide adducts are, for example, reaction products of diamines such as, for example, ethylenediamine, diethylenetriamine, triethylenetetramine, m-xylylenediamine and/or bis(aminomethyl)cyclohexane with terminal epoxides such as, for example, polyglycidyl ethers of polyhydric phenols listed above.

Polyamidoamine curing agents can be obtained, for example by reacting polyamines with polycarboxylic acids such as dimerized fatty acids. In addition to the above polyamines, the water-soluble polyoxypropylenediamines with molecular weights of 190 to 2,000 and also the readily water-dispersible curing agents, such as are described in the German Auslegeschrift 2,332,177 and the European Patent 0,000,605, for example, modified amine adducts are preferably employed. To cure the coating to completion, the coatings obtainable from these dispersions may also be heated for 30 to 120 minutes at an elevated temperature, preferably within the range of 50° C. to about 120° C.

For higher temperature cure applications, aminoplast resins can be used as curing agents for epoxy resins having a high equivalent weight, e.g. greater than 700. Generally, from 5, preferably from 10, to about 40, preferably to about 30 weight percent of aminoplast resins, based on the combined weight of the epoxy resin and aminoplast resin, is used. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Examples of aldehydes include formaldehyde acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins.

Commercial examples of water-compatible curing agents include EPI-CURE® 8535, 8535, 8537, 8290 and 9292 curing agents (available from Shell Chemical Co.), ANQUAMINE 401, Casamid 360 and 362 curing agents (Air Products); EPILINK 381 and DP660 curing agents (Akzo Chemical Co.); Hardener HZ350, Hardeners 92-113 and 92-116 (Ciba Geigy); BECKOPOX EH659W, EH623W, VEH2133W curing agents (Hoechst Celanese) and EPOTUF 37-680 and 37-681 curing agents (Reichhold Chemical Co.).

The curable epoxy resin composition can be cured at a temperature within the range of from about 5° C., preferably from about 20° C., to about 200° C., preferably to about 175° C. for a time effective to cure the epoxy resin.

The aqueous dispersions of the instant invention and curing agents described above can serve as components of paints and coatings for application to substrates such as, for example, metal and cementitious structures. To prepare such paints and coatings, these resins are blended with primary, extender and anti-corrosive pigments, and optionally, additives such as surfactants, antifoam agents, rheology modifiers and mar and slip reagents. The selection and amount of these pigments and additives depends on the intended application of the paint and is generally recognized by those skilled in the art.

Examples of primary pigments include rutile titanium dioxide, such as KRONOS® 2160(Kronos, Inc.) and TI-Pure® R-960 from Du Pont, buff titanium dioxide, red iron oxide, yellow iron oxide and carbon black. Examples of extender pigments include calcium meta silicate, such as 10ES WOLLASTOKUP®(NYCO Minerals, Inc.), barium sulfate, such as SPARMITE®(Harcros Pigments, Inc.) and aluminum silicate, such as ASP®170(Englehard Corp.). Examples of anticorrosive pigments include calcium strontium phosphosilicate, such as HALOX SW111(Halox Pigments), zinc ion modified aluminum triphosphate, such as K-WHITE®84(Tayca Corp.) and basic aluminum zinc phosphate hydrate, such as HEUCOPHOS®ZPA(Heuco Tech, Ltd.).

Additional surfactants can be included in waterborne epoxy paints and coatings to improve both pigment and substrate wetting. Such surfactants are typically non-ionic, examples of which include TRITON® X-100 and TRITON X-405(Union Carbide), PLURONIC F-88 (BASF) and SURFYNOL® 104(Air Products and Chemicals).

Anti-foam agents and defoamers suppress foam generation during manufacture of the paint or coating. Useful defoamers include DREWPLUS®L-475(Drew Industrial Div.), DE FO®P1-4 Concentrate(Ultra Additives) and BYK®033 (BYK-Chemie).

Rheological additives are employed to obtain proper application properties. There are three types of additives that provide the desired thickening and shear thinning required for waterborne epoxy coatings; namely, hydroxyethylcellulose, organically modified hectorite clays and associative thickeners. NATROSOL®250 MBR and NATROSOL Plus(Aqualon) are examples of modified hydroxyethylcellulosics and BENTONE®LT(RHEOX, Inc.) is representative of a hectorite clay. ACRYSOL®QR-708(Rohm and Haas Co.) is an often useful associative thickener.

Mar and slip agents improve early resistance to abrasion from scrubbing or light foot traffic. Polydimethylsiloxanes and polyethylene waxes are used in this regard. An example of a commercially available wax is MICHEM LUBE®182 (MICHELMAN, INC.).

The curable paint and coating compositions can be applied to a substrate by brush, spray, or rollers.

Illustrative Embodiment

The following illustrative embodiments describe the process of the invention and are provided for illustrative purposes and are not meant as limiting the invention.

Examples 1–3 and 10 demonstrate the preparation of the epoxy-functional polyether emulsifier and examples 4–9 and 11 demonstrate the use of the epoxy-functional polyether emulsifier in the formation of the aqueous dispersion compared with using an epoxidized polyethylene glycol as an emulsifier in Comparative Example 1.

EPON® Resin 828 (a diglycidyl ether of dihydric phenol having epoxy equivalent weight of 187–188) and EPONEX Resin 1510 (a hydrogenated diglycidyl ether of dihydric phenol having epoxy equivalent weight of 220) were obtained from Shell Chemical Company.

TESTING METHODS

I. Viscosity Viscosities were determined on the obtained emulsion or dispersion by means of a Brookfield Synchro Lectric Viscometer from Brookfield Engineering Laboratories.

II. Particle Size The determination of emulsion and dispersion particle sizes was accomplished with a Brookhaven Bi-DCP Particle Sizer from Brookhaven Instruments Corporation.

III. Percent Solids The percent solids of all products were measured by spreading a 0.5 gram sample of the product onto aluminum foil, placing the coated foil into a forced draft oven, held at 120° C., for 10 minutes, determining the residual weight of the film ratioing the residual weight to the total weight and multiplying by 100.

IV. Weight per Epoxide The weight per epoxide(WPE) of all products was determined by drying a weighed amount of sample by means of azeotropic distillation with methylene chloride then titrating the residue by known methods and correcting for percent solids to determine the WPE at 100% solids content.

V. Settling Settling was determined by observing the settling, with time, of a sample contained in a centrifuge tube.

Preparation of Surfactant

EXAMPLE 1

Preparation of alpha-(2-carboxymethyl)-omega-methoxy-. poly(oxy-1,2-ethanediyl)

To a 3000 mL, four neck flask, fitted with a stirrer, thermocouple, air sparge tube, condenser and addition funnel, was added 495.6 grams (0.099 equiv.) of polyethylene glycol monomethyl ether of approximately 5000 Mn(Aldrich Chemical Co.),15.4 grams (0.099 equiv) of 2,2,6,6-tetramethyl-1-piperidinyloxy, free radical (Aldrich Chemical Co., TEMPO, free radical) and 1000 grams of dichloromethane. The mixture was heated to reflux, then air was introduced into the mixture through the sparge tube. Next, concentrated nitric acid (15.4 grams) was then added over 15 minutes and the mixture was held at reflux for 19 hours. Volatiles were then removed by means of a rotary evaporator. The residue solidified upon cooling. It was ground to a powder, washed with 2-propanol and dried in a vacuum oven at 40° C. to constant weight. NMR Analysis confirmed conversion of hydroxyl to carboxyl functionality. The solid possessed an acid equivalent weight of 5025.

EXAMPLE 2

Preparation of an Epoxy-Functional Surfactant

EPON®Resin 828 (80.9 grams, 0.433 eq.) from Shell Chemical Co., 75.38 grams (0.015 equivalent) of the carboxylic acid of Example 1, and 0.16 grams of ethyltriphenylphosphonium iodide were reacted under nitrogen at 120° C. for 2.5 hours, then the mixture was isolated. The WPE of the product was determined to be 378.

EXAMPLE 3

Preparation of an Epoxy-Functional Surfactant

EPONEX® Resin 1510 (66 g, 0.305 eq.), 50 g of an alpha-(2-carboxymethyl)-omega-methoxy-. poly(oxy-1,2-ethanediyl) of equivalent weight 4762 (prepared according to the procedure of Example 1) and 0.1 gram of ethyltriphenylphosphonium iodide were reacted under nitrogen at 120° C. for 90 minutes, then the mixture was isolated. The WPE of the product was found to be 426.

Preparation of Emulsion (Aqueous Dispersion)

EXAMPLE 4
Preparation of an Emulsion

EPON® Resin 828, (267 g, 1.43 eq.), bisphenol A (83.13 g, 0.729 eq.) and 0.25 g of ethyltriphenylphosphonium iodide were added to a 1 liter resin kettle. The kettle was flushed with nitrogen, then the contents were warmed to 115° C. and held until a solution formed. The contents were warmed slowly to 170° C. and maintained until the product WPE attained 504. The mixture was cooled to 75° C., during which time 51 grams of Ektasolve®EP was added. When the temperature reached 75 ° C., 49.8 grams of the surfactant prepared in Example 2 was added. Next, the addition of 98.4 grams of deionized water was initiated, and the mixture was allowed to cool until the mixture inverted from a water in oil to an oil in water mixture. It was held at 54°–45° C. for 50 minutes, then rewarmed to 60° C. and held at that temperature for 1.5 hours. Next, 7.27 grams of Heloxy® 7 Modifier, a commercial monoglycidyl ether from Shell Chemical Co. were added followed by 24.4 grams of Ektasolve EP and 148.2 grams deionized water. The emulsion was then isolated.

EXAMPLE 5
Preparation of an Emulsion

EPON® Resin 828, (262.6 g, 1.405 eq.), bisphenol A(81.6 g, 0.716 eq.) and 0.2 g of ethyltriphenylphosphonium iodide were added to a 1 liter resin kettle. The kettle was flushed with nitrogen, then the contents were warmed to 101° C. and held until a solution formed. The contents were warmed slowly to 170° C. and maintained until the product WPE attained 510. The mixture was cooled to 75° C., during which time 51 grams of Ektasolve®EP was added. When the temperature reached 75° C., 55.6 grams of the surfactant prepared in Example 3 were added. Next, the addition of 98.4 grams of deionized water was initiated and the mixture was allowed to cool until the mixture inverted from a water in oil to an oil in water mixture. The inverted mixture was maintained at 60° C. for 1.5 hours, then 7.27 grams of Heloxy 7 was added. Next, 24.4 grams of Ektasolve EP and 147.6 grams deionized water were added. The emulsion was then isolated.

The following properties of the final product were determined to be: viscosity, 1700 cP; % solids, 56.7;WPE, 850 and number average particle size, 0.89 microns.

EXAMPLE 6
Preparation of an Epoxy Emulsion by the "In-Situ" Method

EPON® Resin 828 (283.9 grams, 1.52 equivalents) and 36.0 grams(0.0076 eq.) of an oxidized polyethylene glycol monomethyl ether of 5000 MW, prepared according to the procedure of Example 1, were added to a one liter resin kettle and warmed to 90° C. under vacuum for 43 minutes. After this time, 80.1 grams(0.703 eq.) of bisphenol A and 0.27 grams of ethyltriphenylphosphonium iodide were added. The mixture was slowly warmed to a peak temperature of 183° C. whereupon the mixture exhibited a WPE of 497. While cooling to 75° C., 51 grams of Ektasolve EP were added; then, 98.4 grams of deionized water were slowly added and cooling was allowed to continue. Despite cooling to 50° C., inversion failed to occur, so 13.8 grams more water was added, and the mixture was rewarmed to 69° C. Another 8 grams of water was added, whereupon inversion took place. After stirring for 50 minutes at 48°–70° C., another 8.0 grams of water were added, followed by 7.27 grams of Heloxy 7, 24.4 grams of Ektasolve EP and 118.1 grams of water.

The following properties of the final product were determined to be: viscosity, 67600 cP; % solids, 57;WPE, 842 and number average particle size, 0.80 microns.

EXAMPLE 7–9 AND COMPARATIVE EXAMPLE 1

Three blends containing either 6.3, 4.5 or 3.0 weight percent (Examples 7, 8, and 9 respectively) of the epoxy-functional polyether from Example 2 (EEHE) were prepared. These blends contained 4.0, 3.0 and 2.0 polyethylene oxide functionality (weight percent hydrophilic character), respectively. Each blend was heated briefly to 60° C. to effect miscibility, then cooled to ambient temperature. Using a Dispermat™ Stirrer (from Byk Gardner, Inc.), each mixture was stirred at 2000 rpm while water was slowly added until inversion took place, subsequently, additional water was rapidly added to render each composition 60% in solids, then the emulsion was isolated. The particle size of each emulsion was assessed by means of a Brinkman particle size analyzer (a light scattering device) as soon as possible after emulsion formation and one month later. Median particle size is shown below. For a singly processed emulsion, <10 μm is considered acceptable. The settling behavior of each was also monitored. These observations are summarized in Table 1.

As comparison, a blend of the product of Example 1 and EPON® Resin 828, 4/96 (w/w), failed to produce an emulsion when treated as above. Upon cessation of stirring the water and organic phases separated.

TABLE 1

| Example | wt. % emulsifier | Particle size (μm) | | % Settling @ 18 days |
|---|---|---|---|---|
| Example 4 | 6.3 EEHE | 5.9* | 5.5** | 6–10 |
| Example 5 | 4.5 EEHE | 9.5 | 9.3 | <5 |
| Example 6 | 3.0 EEHE | 11.7 | 11.6 | <5 |
| Comp. Example 1 | 4.0 PEGMMEA | no emulsion | | no emulsion |

*Initial
**After one month

EXAMPLE 10
Preparation of an Epoxy-Functional Surfactant

EPON® Resin 828 (85.9 grams, 0.459 eq.), 80 grams (0.0169 equivalent) of a carboxylic acid prepared by the procedure described in Example 1, and 0.16 grams of ethyltriphenylphosphonium iodide were reacted under nitrogen at 120° C. for 1 hour, then the mixture was isolated. The WPE of the product was determined to be 378.

EXAMPLE 11
Preparation of an Emulsion

EPON® Resin 828, (267 g, 1.43 eq.), bisphenol A(83.13 g, 0.729 eq.) and 0.25 g of ethyltriphenylphosphonium iodide were added to a 1 liter resin kettle. The kettle was flushed with nitrogen, then the contents were warmed to 120° C. and held until a solution formed. The contents were warmed slowly before exotherming to 160° C. The mixture was maintained at 160° C. for one hour, after which time the product WPE attained 523. The mixture was cooled to 75° C., during which time 51 grams of Ektasolve®EP was added. When the temperature reached 75° C., 49.8 grams of the surfactant prepared in Example 10 was added. Next, the addition of 98.4 grams of deionized water was initiated, and the mixture was allowed to cool until the mixture reached 36°–40° C. when it inverted from a water in oil to an oil in water mixture. In the morning, it was rewarmed to 60° C., then 7.27 grams of HELOXY® 7 Modifier, a commercial monoglycidyl ether from Shell Chemical Co. were added followed by 24.4 grams of Ektasolve EP. The rate of stirring was increased from 450 to 700 rpm; then, 148.2 grams deionized water was added within 35 minutes. The emulsion was then isolated. After stirring for 2.5 hours, another 85 grams of water was added, then the emulsion was isolated.

The emulsion possessed a viscosity of 2,128 centipoise at room temperature(Brookfield viscosity, spindle #5, 50 rpm), and a number average particle size of 0.36 microns. The percent solids was determined to be 53.5% and the WPE was found to be 892.

I claim:

1. An aqueous dispersion comprising:
   a) water;
   b) at least one epoxy resin having a functionality of greater than about 1.0 epoxide group per molecule;
   c) from about 1 to about 20 weight percent, based on the epoxy resin of at least one epoxy-functional polyether as having the formula:

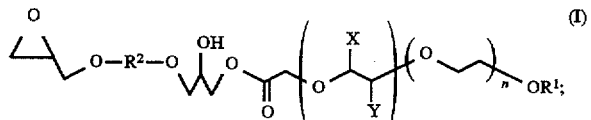

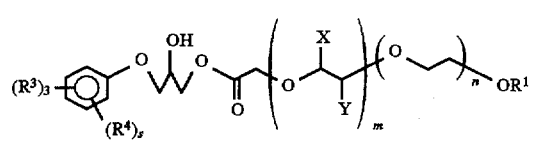

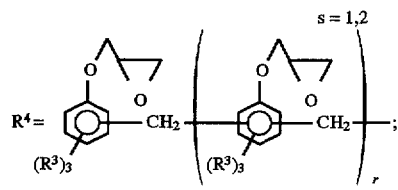

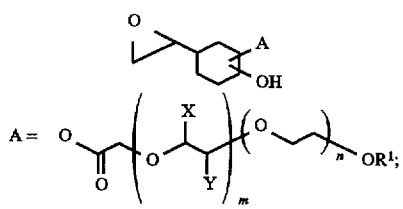

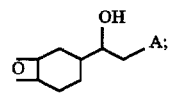

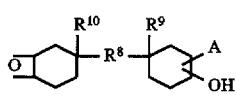

wherein $R^1$ is a $C_1-C_{15}$ alkyl, aryl or alkylaryl group, $R^2$ is a divalent aliphatic group, a divalent cycloaliphatic group, a divalent aryl group, or a divalent arylaliphatic group, $R^3$ is independently a hydrogen or a $C_1-C_{10}$ alkyl group, $R^8$ is a divalent aliphatic group optionally containing ether or ester group(s) or together with $R^9$ or $R^{10}$ form a spiro ring optionally containing heteroatoms, and $R^9$ and $R^{10}$ are independently hydrogen or $R^9$ or $R^{10}$ together with $R^8$ form a spiro ring optionally containing heteroatoms such as oxygen, r is a real number from about 0 to about 6, X and Y are independently a hydrogen, methyl or ethyl group with the provision that if X is methyl or ethyl, Y is hydrogen or if Y is methyl or ethyl, X is hydrogen and n+m is a real number from about 15 to about 450 and n is a real number in an amount effective to provide emulsifying property.

2. The aqueous dispersion of claim 1 wherein the amount of the epoxy resin component (b) is from about 30 to about 70 percent by weight, based on the total dispersion.

3. The aqueous dispersion of claim 2 wherein the epoxy-functional polyether has an molecular weight within the range of about 1000 to about 40,000.

4. The aqueous dispersion of claim 3 wherein n is a real number of at least 15.

5. The aqueous dispersion of claim 1 wherein the epoxy resin has a functionality of at least about 1.2.

6. The aqueous dispersion of claim 2 further comprising an monoepoxide diluent.

7. The aqueous dispersion of claim 6 wherein the diluent comprises a water-immiscible $C_{8-20}$ aliphatic monoepoxide.

8. A curable epoxy resin composition comprising the aqueous dispersion of claim 1 and a water-miscible curing agent for the epoxy resin.

9. A coating composition comprising the aqueous dispersion of claim 1 and an epoxy resin curing agent.

10. A coating composition comprising the aqueous dispersion of claim 4 and an epoxy resin curing agent.

11. A coating composition comprising the aqueous dispersion of claim 6 and an epoxy resin curing agent.

12. A process for the preparation of an aqueous dispersion comprising mixing under conditions effective to provide an oil-in-water emulsion a) water and b) an epoxy resin having a functionality of greater than about 1.0 epoxide group per molecule in the presence of c) from about 1 to about 20 weight percent, based on the epoxy resin of at least one epoxy-functional polyether having the formula:

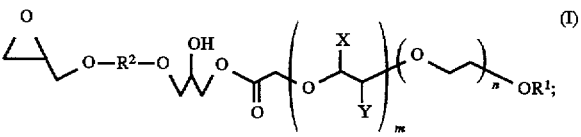

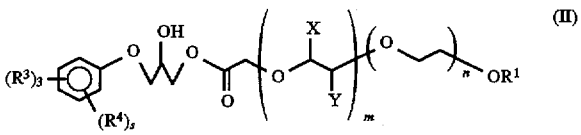

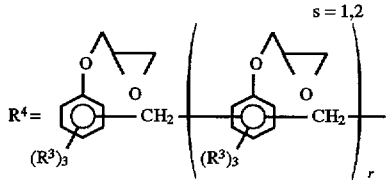

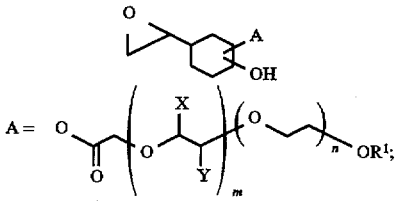

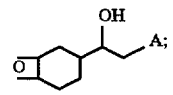

-continued

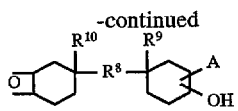 (V)

wherein $R^1$ is a $C_1$–$C_{15}$ alkyl, aryl or alkylaryl group, $R^2$ is a divalent aliphatic group, a divalent cycloaliphatic group, a divalent aryl group, or a divalent arylaliphatic group, $R^3$ is independently a hydrogen or a $C_1$–$C_{10}$ alkyl group, $R^8$ is a divalent aliphatic group optionally containing ether or ester group(s) or together with $R^9$ or $R^{10}$ form a spiro ring optionally containing heteroatoms, and $R^9$ and $R^{10}$ are independently hydrogen or $R^9$ or $R^{10}$ together with $R^8$ form a spiro ring optionally containing heteroatoms such as oxygen, r is a real number from about 0 to about 6, X and Y are independently a hydrogen, methyl or ethyl group with the provision that if X is methyl or ethyl, Y is hydrogen or if Y is methyl or ethyl, X is hydrogen and n+m is a real number from about 15 to about 450 and n is a real number in an amount effective to provide emulsifying property.

* * * * *